(12) United States Patent
Hsieh

(10) Patent No.: US 7,391,302 B2
(45) Date of Patent: Jun. 24, 2008

(54) CAR-USED LOCK WITH ALERTING FUNCTION

(76) Inventor: Hui-Hua Hsieh, P.O. Box 90, Tainan City 70499 (TW)

( * ) Notice: Subject to any disclaimer, the term of this patent is extended or adjusted under 35 U.S.C. 154(b) by 193 days.

(21) Appl. No.: 11/368,518

(22) Filed: Mar. 7, 2006

(65) Prior Publication Data

US 2007/0210928 A1 Sep. 13, 2007

(51) Int. Cl.
*B60R 25/10* (2006.01)
(52) U.S. Cl. .................. 340/426.1; 340/693.1; 340/180; 340/287
(58) Field of Classification Search ............... 340/426.1
See application file for complete search history.

(56) References Cited

U.S. PATENT DOCUMENTS

2003/0034915 A1* 2/2003 Sasaki et al. ........... 342/357.07
2004/0066275 A1* 4/2004 Mickler ..................... 340/5.33

* cited by examiner

*Primary Examiner*—Davetta Goins
*Assistant Examiner*—Ojiako Nwugo

(57) ABSTRACT

A car-used lock with alerting function comprises a lock installed with a sensor, a buzzer and a transmitter; a receiving control device for receiving signals from the transmitter; the receiving control device being installed with a receiver, a decoder, a microprocessor, an indicator, leaning keys, a dialing control wire and a power source; a car-used handset connected to the receiving control device and having a battery. The receiver serves to transfer the high frequency signals emitted from the transmitter into digital signals. The decoder serves to transfer the digital signals into codes. The microprocessor serves to compare the codes with the built-in data. The lock has the affect of immediate alert and communication with legal frequency bands and power. The power source is from the car used handset. Furthermore, two sets of quick dialing numbers are used so that the line busy of the car owner can be avoided.

7 Claims, 2 Drawing Sheets

CAR-USED LOCK WITH ALERTING FUNCTION

FIELD OF THE INVENTION

The present invention relates to car-used locks, and in particular to a multi-functional car lock, wherein the lock is effective in the thief-proof. The present invention has the affect of immediate alert and communication with legal frequency bands and power. The power source is from the car used handset. No additional battery is necessary. Furthermore, two sets of quick dialing numbers are used so that the line's busy of the car owner's phone can be avoided.

BACKGROUND OF THE INVENTION

Currently door lock is assembled to a steering wheel of the car so that the thief cannot rotate the steering wheel. Or the door lock is assembled to a gear switch of a car so that the gear switch cannot be operated. Or the door lock is assembled the oil treadle so that the thief cannot trading the oil treadle to drive the car. However above-mentioned way cannot effectively prevent the thief to steal the car.

SUMMARY OF THE INVENTION

Accordingly, the primary object of the present invention is to provide a multi-functional car lock, wherein the lock is effective in the thief-proof. The present invention has the affect of immediate alert and communication with legal frequency bands and power. The power source is from the car used handset. No additional battery is necessary. Furthermore, two sets of quick dialing numbers are used so that the line's busy of the car owner's phone can be avoided.

To achieve above object, the present invention provides a car-used lock with alerting function which comprises a lock installed with a sensor, a buzzer and a transmitter; a receiving control device for receiving signals from the transmitter; the receiving control device Furthermore, installed with a receiver, a decoder, a microprocessor, an indicator, leaning keys, a dialing control wire and a power source; a car-used handset connected to the receiving control device and having a battery. The receiver serves to transfer the high frequency signals emitted from the transmitter into digital signals. The decoder serves to transfer the digital signals into codes. The microprocessor serves to compare the codes with the built-in data. The lock has the affect of immediate alert and communication with legal frequency bands and power. The power source is from the car used handset. Furthermore, two sets of quick dialing numbers are used so that the occupation of line of the car owner can be avoided.

The various objects and advantages of the present invention will be more readily understood from the following detailed description when read in conjunction with the appended drawing.

DETAILED DESCRIPTION OF THE INVENTION

Figure 1:
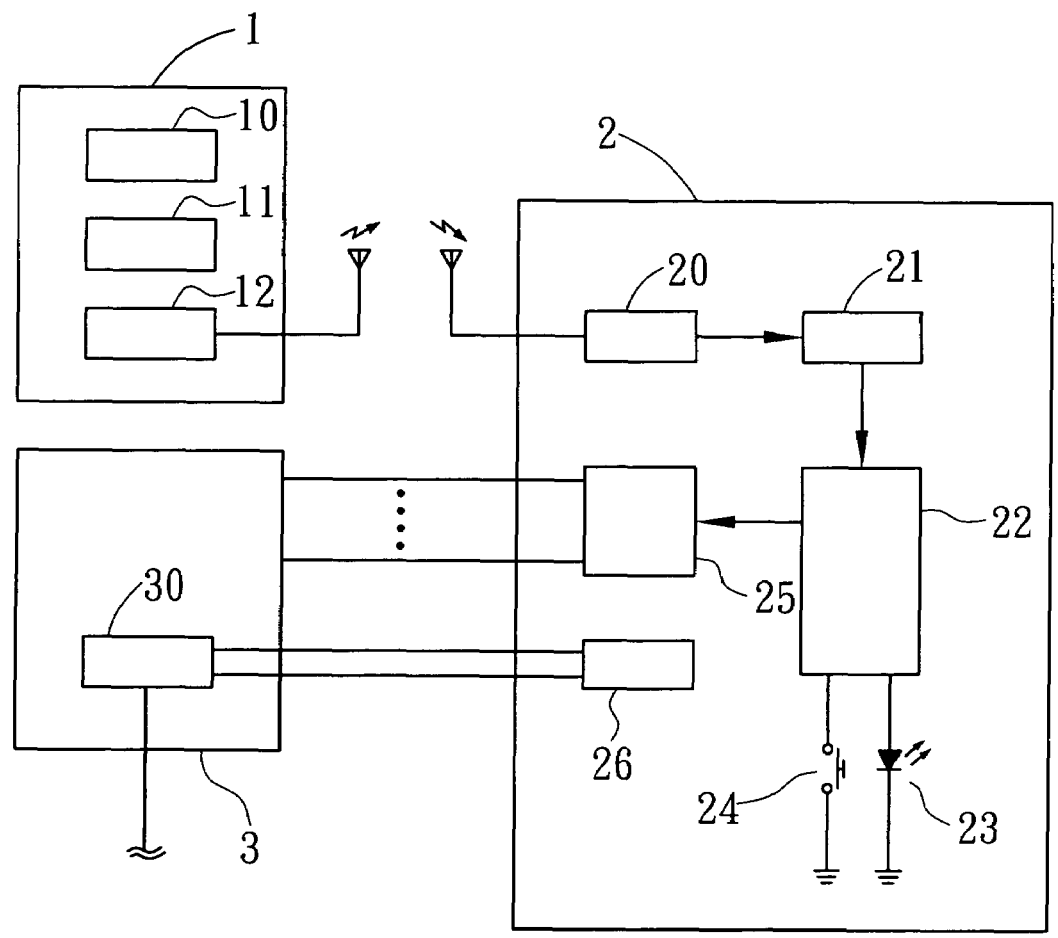
FIG. 1 is the functional block diagram of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims. Referring to FIG. 1, the elements of the present invention will be described herein.

A lock 1 is installed with a sensor 10, a buzzer 11 and a transmitter 12.

A receiving control device 2 receives signals from the transmitter 12. The receiving control device 2 is installed with a receiver 20, a decoder 21, a microprocessor 22, an indicator 23, a leaning key 24, a dialing control wire 25 and a power source 26. The receiver 20 serves to convert the high frequency signals emitted from the transmitter 12 into digital signals. The decoder 21 serves to transfer the digital signals into codes. The microprocessor 22 serves to compare the codes with the built-in data.

A car used handset is connected to the receiving control device and has a battery 30. The car used handset 3 is one of a GSM handset, a CDMA handset, a PHS handset and other handset with quick operation keys. The battery 30 can be charged by a portable charger.

When one leaning key 24 is pressed, after one second, the indicator 23 will light up. Then the transmitter 12 emits signals which are received by the receiver 20. Then the microprocessor 22 performs the work of comparison. The data is stored. When the leaning key 24 is pressed continuously through seven seconds, the indicator 23 will de-actuate automatically. All the data is cleared. Thereby the lock 1 and the receiving control device 2 can be matched. Each dialing control wire 25 has seven relays. Each relay has two independent wires which are connected to a car used handset 3. Thus, there are 14 wires. The former three relays are a first set. The later three relays are a second set. In operation, former three relays actuates sequentially so that the first set can be dialed quickly. After 20 seconds, the fourth relays will actuate to cut off the circuit. The process is repeated twice. The second set can be dialed to avoid the line is occupied. The battery 30 is connected to the car used handset 3 in parallel.

Figure 2:
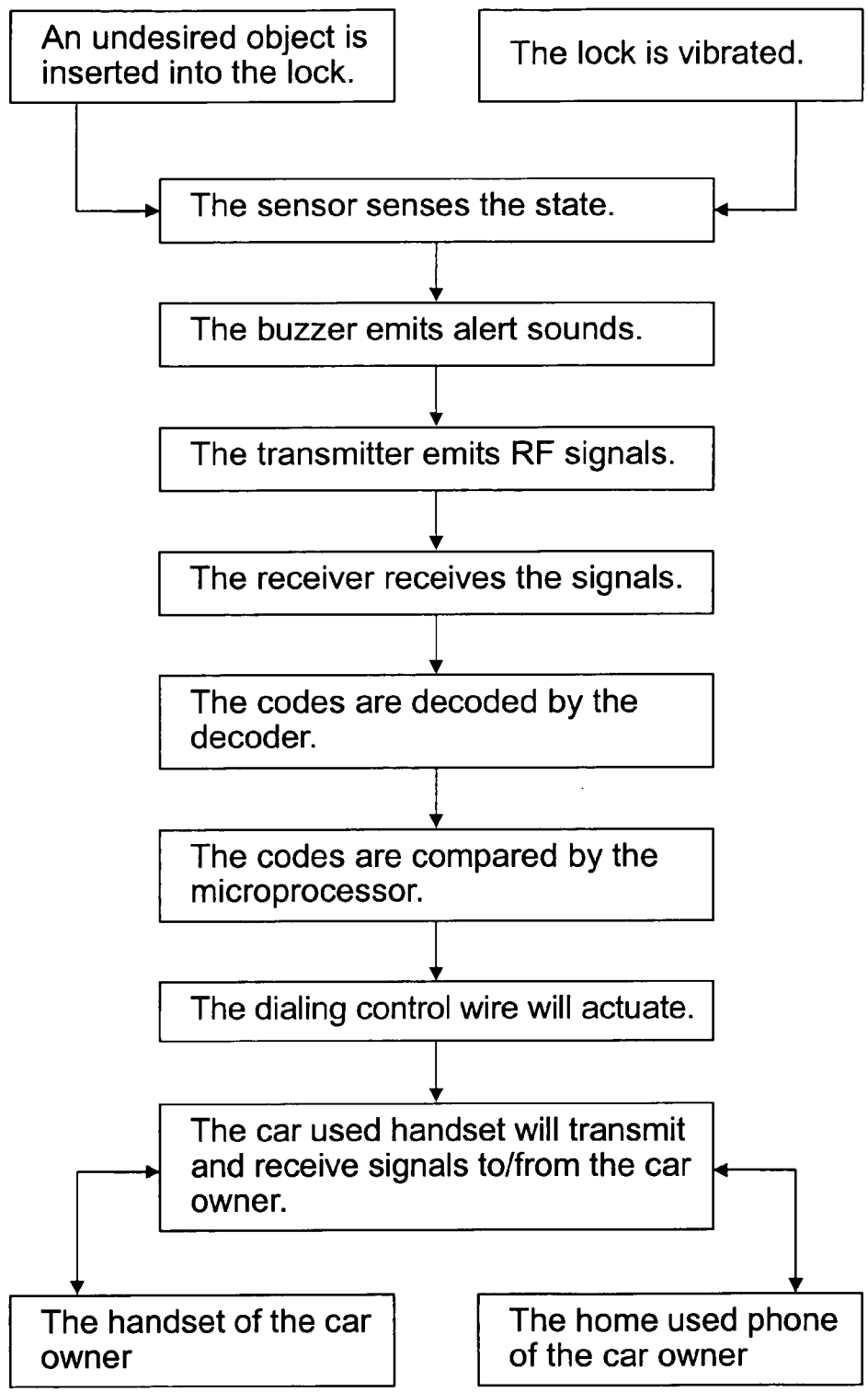
FIG. 2 shows the flow diagram of the present invention.

In use, referring to FIGS. 1 and 2, when an undesired object is inserted into the lock 1 or the lock 1 is vibrated, the sensor 10 will sense the state so that the buzzer 11 emits alert sounds. If the lock is not opened in a preset time period, the buzzer 11 will buzz continuously and the transmitter 12 emits RF signals to the receiver 20. The codes are decoded by the decoder 21. The codes are compared by the microprocessor 22 and then stored. The dialing control wire 25 will actuate. Then the car used handset 3 will dial the handset or home used phone of the car owner. The number is dedicated by the car and thus the owner will know that the car has an abnormal state and keep attention to the state. If the signals are error signals, the phone cannot interrupted. Thus, the present invention has the affect of burglar proof and alerting the owner immediately. The alert range can be expanded.

Advantages of the present invention will be described herein. The present invention has the affect of immediate alert and communication by using legal frequency bands and power. The power source is from the car used handset. No additional battery is necessary. Thereby the operation is convenient. No additional battery is necessary and thus the operation is convenient. Two sets of quick dialing numbers are used so that the occupation of line of the car owner can be avoided. The car used handset 3 is one of a GSM handset, a CDMA handset, a PHS handset and other handset with quick operation keys. The battery 30 can be charged by a portable charger. The receiving control device can control a GSM or a PHS dialing device so as to have the function of quick dialing.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A car-used lock with alerting function comprising:
    a lock installed with a sensor, a buzzer and a transmitter;
    a receiving control device for receiving signals from the transmitter;
    the receiving control device being installed with a receiver, a decoder, a microprocessor, an indicator, a leaning key, a dialing control wire and a power source;
    a car-used handset connected to the receiving control device and having a battery; and
    wherein when an undesired object is inserted into the lock or the lock is vibrated, the sensor will sense the state so that the buzzer emits alert sounds; if the lock is not opened in a preset time period, the buzzer will buzz continuously and the transmitter emits RF signals to the receiver; codes are decoded by the decoder; the codes are compared by the microprocessor and the stored; the dialing control wire will actuate; and then the car used handset will dial the handset or home used phone of the car owner; the number is dedicated by the car and thus the owner will know that the car has an abnormal state and keep attention to the state; if the signals are error signals, the phone can not be interrupted; and
    wherein each dialing control wire has seven relays; each relay has two independent wires which are connected to a car used handset; thus, there are wires; the former three relays are as a first set; the later three relays are as a second set, wherein in operation, former three relays actuates sequentially so that the first set can he dialed quickly, after 20 seconds, the fourth relays will actuate to cut off the circuit; the process is repeated twice; the second set can be dialed to avoid line busy.

2. The car-used lock with alerting function as claimed in claim 1, wherein the receiver serves to transfer the high frequency signals emitted from the transmitter into digital signals.

3. The car-used lock with alerting function as claimed in claim 1, wherein the decoder serves to transfer the digital signals into codes.

4. The car-used lock with alerting function as claimed in claim 1, wherein the microprocessor serves to compare the codes with the built-in data.

5. The car-used lock with alerting function as claimed in claim 1, wherein when one leaning key is pressed, after one second, the indicator will light up; then the transmitter emits signals which are received by the receiver; then the microprocessor performs the work of comparison; the data is stored; when the leaning key is pressed continuously through seven seconds, the indicator will de-actuate automatically; all the data is cleared; thereby the Lock and die receiving control device is compared.

6. The car-used lock with alerting function as claimed in claim 1, wherein the battery is connected to the car used handset in parallel.

7. The car-used lock with alerting function as claimed in claim 1, wherein the car used handset is one of a GSM handset, a CDMA handset, a PIIS handset and other handset with quick operation keys; and the battery is charged by a portable charger.

* * * * *